US007815285B2

(12) United States Patent
Barkley et al.

(10) Patent No.: US 7,815,285 B2
(45) Date of Patent: Oct. 19, 2010

(54) PRINTHEAD HAVING A PLURALITY OF PRINT MODES

(75) Inventors: Lucas D. Barkley, Lexington, KY (US); David G. King, Shelbyville, KY (US); Randall D. Mayo, Georgetown, KY (US); George K. Parish, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 234 days.

(21) Appl. No.: 11/254,456

(22) Filed: Oct. 20, 2005

(65) Prior Publication Data

US 2007/0091136 A1    Apr. 26, 2007

(51) Int. Cl.
*B41J 2/145*    (2006.01)

(52) U.S. Cl. .............................. 347/41; 347/12; 347/14

(58) Field of Classification Search .................. 347/5, 347/9, 10–12, 14, 15, 19, 40–41, 42
See application file for complete search history.

(56) References Cited

U.S. PATENT DOCUMENTS

| 5,677,716 A | 10/1997 | Cleveland |
| 6,033,048 A | 3/2000 | Nicoloff, Jr. et al. |
| 6,629,752 B1* | 10/2003 | Mayo et al. .................. 347/41 |
| 2002/0122086 A1* | 9/2002 | Matsubara et al. ............ 347/12 |
| 2004/0095405 A1* | 5/2004 | Schloeman et al. ........... 347/12 |
| 2005/0104915 A1* | 5/2005 | Hara ........................... 347/14 |

* cited by examiner

*Primary Examiner*—Lam S Nguyen

(57) ABSTRACT

Printheads configured to operate in accordance with a plurality of print modes. For example, one of the plurality of print modes can be selected in accordance with a bit of address data received by the printhead. In an exemplary embodiment, the selection of print mode can be accomplished by switching one or more actuator (e.g., heater) circuit addresses on the printhead.

20 Claims, 9 Drawing Sheets

Doublets

Doublets

| BIT # | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| CMY EVT ADATA | CMY ENCODED ADDRESS (10) | | | | N/U | N/U | CMY EA ADDRESS (2) | | N/U | N/U | N/U | N/U | N/U | N/U | N/U | N/U |
| C PDATA | P8F1 | P8F2 | P7F1 | P7F2 | P6F1 | P6F2 | P5F1 | P5F2 | P4F1 | P4F2 | P3F1 | P3F2 | P2F1 | P2F2 | P1F1 | P1F2 |
| M PDATA | P8F1 | P8F2 | P7F1 | P7F2 | P6F1 | P6F2 | P5F1 | P5F2 | P4F1 | P4F2 | P3F1 | P3F2 | P2F1 | P2F2 | P1F1 | P1F2 |
| Y PDATA | P8F1 | P8F2 | P7F1 | P7F2 | P6F1 | P6F2 | P5F1 | P5F2 | P4F1 | P4F2 | P3F1 | P3F2 | P2F1 | P2F2 | P1F1 | P1F2 |
| BIT # | 15 | 14 | 13 | 12 | 11 | 10 | 9 | 8 | 7 | 6 | 5 | 4 | 3 | 2 | 1 | 0 |
| CMY EVT ADATA | NNH1 | N/U | N/U | NNH2 | N/U | N/U | NNH3 | N/U | N/U | TSR1 | TSR2 | TSR3 | CMY FIRE MODE | CMY DIRECTION | PRINT MODE | |
| C PDATA | P9F1 | P9F2 | P10F1 | P10F2 | P11F1 | P11F2 | P12F1 | P12F2 | P13F1 | P13F2 | P14F1 | P14F2 | P15F1 | P15F2 | P16F1 | P16F2 |
| M PDATA | P9F1 | P9F2 | P10F1 | P10F2 | P11F1 | P11F2 | P12F1 | P12F2 | P13F1 | P13F2 | P14F1 | P14F2 | P15F1 | P15F2 | P16F1 | P16F2 |
| Y PDATA | P9F1 | P9F2 | P10F1 | P10F2 | P11F1 | P11F2 | P12F1 | P12F2 | P13F1 | P13F2 | P14F1 | P14F2 | P15F1 | P15F2 | P16F1 | P16F2 |

PRINTHEAD HAVING A PLURALITY OF PRINT MODES

TECHNICAL FIELD

The present invention relates to printheads for use with imaging devices, and more specifically, in one embodiment, to a unique printhead configured to operate in accordance with a plurality of modes, such as wherein one of the plurality of modes is selected in accordance with a bit of address data received by the printhead.

BACKGROUND OF THE INVENTION

An imaging device, such as an ink jet printer forms an image on a print media by ejecting ink from a printhead. Typically, an ink jet printhead includes at least one array of individually selectable ink jetting nozzles (e.g., a columnar array) that eject ink (such as by an actuator, such as a heater, piezoelectric device, MEMs device, or the like) to form a pattern of ink dots on the print media. The nozzles typically have a fixed vertical spacing between them, such as 1/600 inch. Additionally, the printhead (and therefore the array of nozzles) usually travels horizontally across the page (referred to hereinafter as a "scan"), with each nozzle being capable of ejecting ink at a fixed horizontal distance for a given scan speed, which can also be 1/600 inch, for example. The term "horizontal", as used herein, indicates the direction of printhead travel, or scan, which is typically perpendicular to the vertical.

According to such an example, the vertical spacing of the nozzles, in combination with the horizontal distance between ink ejections, define a printing grid, or matrix, of pixels having a given vertical and horizontal resolution. The combined behavior of the scanning of the nozzle array and the amount of vertical movement (e.g., via indexing of the print media between consecutive scans) can allow, for example in some conventional printheads, ink to be ejected to form a dot at every pixel in a section of an image to be formed. In this condition, the corresponding grid of pixels is said to be "perfectly covered." If the printhead can perfectly cover the grid in one scan, the printhead is said to operate in a perfectly covered print mode.

To accomplish a scan as previously described, an ink jet printer may include a reciprocating printhead carrier that transports one or more ink jet printheads across the print media along a (e.g., bi-directional) scanning path. A media advancing system is used to incrementally advance the print media in a media feed direction, also commonly referred to as a sub-scan direction or vertical direction, between scans in the main scan direction, or after all data intended to be printed with the print media at a particular stationary position has been completed. Also, typically, the columnar arrays of nozzles of the ink jet printhead, when mounted to the printhead carrier, extend in a direction parallel to the media feed direction.

For a given stationary position of the print media, printing may take place during one or more unidirectional scans of the printhead carrier. The term, unidirectional, often is used to refer to scanning in either, but only one, of the two bi-directional scanning directions. Thus, bi-directional scanning refers to two successive unidirectional scans in opposite directions.

The term, swath, refers to the area on the print medium traced by the printhead during a particular unidirectional scan of the printhead carrier where ink may be deposited. Thus, during the printing of a swath, individual printhead nozzles of the columnar nozzle array(s) trace along imaginary rasters spaced apart in the media feed direction and eject ink to form a printed pattern, such as for example printed lines, each line being formed by a plurality of ink dots. The swath height of a swath is determined, at least in part, by the extent of the columnar array of nozzles in the media feed direction, e.g., the distance between the top-most nozzle and the lower-most nozzle of the columnar nozzle array used in printing the swath.

Those working in the imaging arts continually strive to improve the print quality of imaging devices, such as ink jet printers. One such attempt is directed to reducing the occurrence of horizontal banding defects in images generated by an ink jet printer. Horizontal banding defects may be observed on print media, such as paper, as a horizontal white band. Such defects may be attributable to errors generated by the media advancing system that is used to advance the media in a media feed direction through the printer during the printing of the text or image on the media. Such errors can be caused, for example, by mechanical tolerances of an index roller and its associated drive train, if the same are used as part of the advancing system, and are often particularly noticeable at the boundaries of a swath.

It is known to mask such indexing errors by adopting an interlaced printing method, also referred to as shingling, wherein each scan of the printhead carrier (also sometimes referred to in the art as a printhead carriage), and therefore swath, is made to vertically overlap a preceding scan/swath. For a given swath, only a portion of the total print data for a given area on the print medium is printed (in other words, for example, only a portion of the pixels in the swath are addressable by ink dots). Thus, each scan of an actuated printhead produces a swath of printed output forming all or portions of multiple print lines, and multiple swaths may be required to complete the printing of any given print line.

Shingling is typically controlled by driver software/firmware associated with the printer (e.g., installed on a host computer, if such a host is present). The driver sends instructions to the printhead (e.g., via a printhead driver ASIC) regarding the specific dots to be placed on the given pass. One common shingling pattern is a 50% checkerboard pattern. For a 50% shingling mode (i.e., 2-pass or 50% interlace level), approximately 50% of the pixels are addressable with dots on any given pass of the printhead. The addressable pixels in a particular pass are typically selected according to a checkerboard pattern. The remaining 50% of the pixels necessary to form the desired images are addressed on a subsequent pass of the printhead. For a printhead with vertically disposed colors, and a raster which contains cyan, magenta and yellow dots, the printhead is usually passed at least six times with a 50% shingling method, twice depositing any cyan dots present in the given raster, twice depositing any magenta dots and twice depositing any yellow dots.

While the shingling method does reduce the line continuation errors of the ink jet printing, some line continuation errors are still noticeable. Furthermore, when a shingling method is employed, the printing speed can be greatly reduced due to the additional number of passes.

Modes of printer operation using a high number of printhead passes (e.g., 8, 16, 32, etc.), hereinafter referred to as high pass printer modes, such as those used in relatively higher quality operation modes (wherein the resolution may change), use shingling to mask swath boundary errors. In addition, the media advance system are often configured with an intentional underfeed, such as 0.3%, in an attempt to guarantee that there is some overlap between dots. Due to human visual perception, it is typically better to have a dark band due to the overlap rather than a white band.

Modes of printer operation wherein a low number of printhead passes are used (hereinafter referred to as low pass printer modes), such as those used in relatively lower quality operation modes, typically do not benefit as much from shingling (e.g., one pass printing inherently exhibits no benefit from shingling). For example, low pass printer modes are typically susceptible to errors in, for example, feedroll diameter and eccentricities causing excessive over or underfeed, swath expansion or compression caused by heater chip bow and rotary encoder error. All of these factors combined can have an effect on stitching together swath boundaries.

While low pass printer modes typically do not benefit from shingling, the print mode of the printhead (sometimes also referred to as the native printhead pattern) can effect, for example, swath overlap and other swath stitching errors. The print mode of a printhead refers to the pattern of pixels the printhead is capable of addressing during a single unidirectional scan (whether it actually forms dots on/in any given one of the pixels depends on, for example, the image being formed, whether shingling is being employed, etc.). As discussed above, in many conventional printheads, the printhead is configured to address each pixel (for a given colorant) in the section of an image corresponding to a respective swath in one pass.

Operating with this print mode, however, can cause problems, such as those resulting from ink drying issues and color image formation. To overcome this problem, it is known in the art to configure, and therefore operate, a printhead in a print mode in which only a fraction of the pixels in the section of the image corresponding to a swath can be addressed in one pass (wherein the unaddressable pixels can be addressed in one or more additional passes). One common printhead print mode is a checkerboard 50% print mode, wherein the printhead is configured to allow it to address, in a single scan, half of the pixels in the section of the image corresponding to that swath (for a given colarant), wherein the pixels addressable in that swath form a checkerboard pattern. Each printhead on conventional printers can typically only operate in one print mode. The print mode of the printhead may be subject to additional shingling print masks from the printer driver.

Various printhead print modes compensate differently for swath boundary stitching errors, drying issues and shrinkage of the print media. The effectiveness of printhead print modes can also be effected by the number of passes employed for the particular print job. As such, the inventors of the present invention have recognized that there is, for example, a need for a printhead capable of operating in an appropriate print mode for the number of passes to be used on a particular print job.

SUMMARY OF THE INVENTION

One embodiment of the present invention is a printhead configured to operate in accordance with a plurality of modes. One of the plurality of print modes can be selected in accordance with a bit of address data received by the printhead.

Another of the embodiments of the present invention is a printhead configured to operate in accordance with a plurality of print modes. One of the plurality of modes can be selected by switching at least one actuator (e.g., heater) circuit address on the printhead.

Still another of the exemplary embodiments of the present invention involve a printhead configured to operate in accordance with a plurality of modes. One of a first mode and a second mode is selected by switching at least one heater circuit address on the printhead. The at least one heater circuit address is switched in response to a bit of address data received by the printhead.

In certain exemplary embodiments, the present invention provides an architecture that is capable of selecting one of a plurality of print modes by heater circuit address switching. Such printheads can be advantageous for ejecting ink in low-pass print operations and reducing horizontal banding, for example.

These and additional advantages will be apparent in view of the detailed description.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 7 is a schematic illustration of exemplary address data that can be received by the printhead according to another embodiment of the present invention;

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF EXEMPLARY EMBODIMENTS OF THE INVENTION

Reference will now be made in detail to various embodiments which are illustrated in the accompanying drawings, wherein like numerals indicate similar elements throughout the views.

Figure 1:
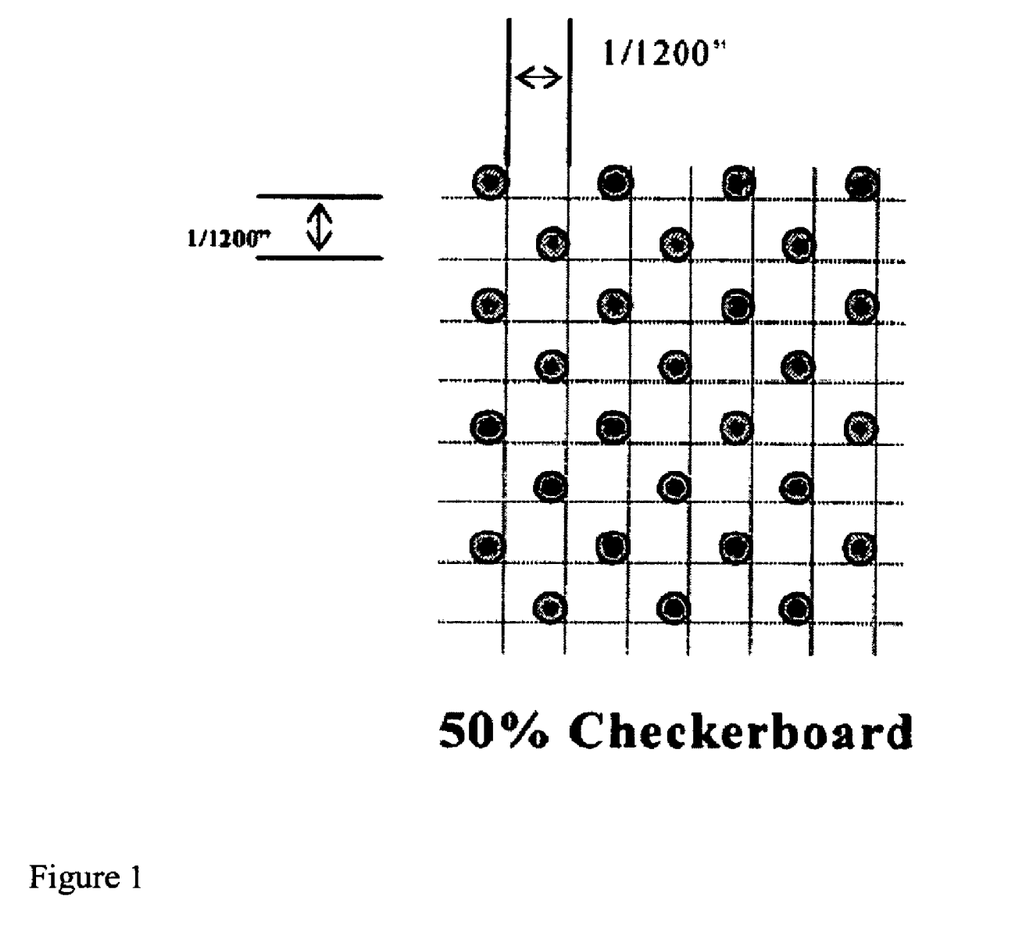
FIG. 1 is an illustration of a 50% checkerboard pattern known in the prior art.

As mentioned above, various printhead print modes are known to those skilled in the art. FIG. 1, illustrates a dot pattern formed by a printhead having a 50% checkerboard print mode. In this example, the pixel spacing is $\frac{1}{1200}''$. Ideally, a printhead might operate in a true 50% checkerboard mode for each colorant. However, it has been found that on many printhead architectures, such as those involving nozzles on either side of a via that feeds ink to the nozzles, implementing a 50% checkerboard print mode may cause actuators on one side of a via to actuate more than the actuators on another side of the via. This can be undesirable from both a fluidic (e.g., the flow of ink from the via to the actuators) and electrical (e.g., the electrical activation of the actuators, such as heaters) standpoint.

Figure 2:
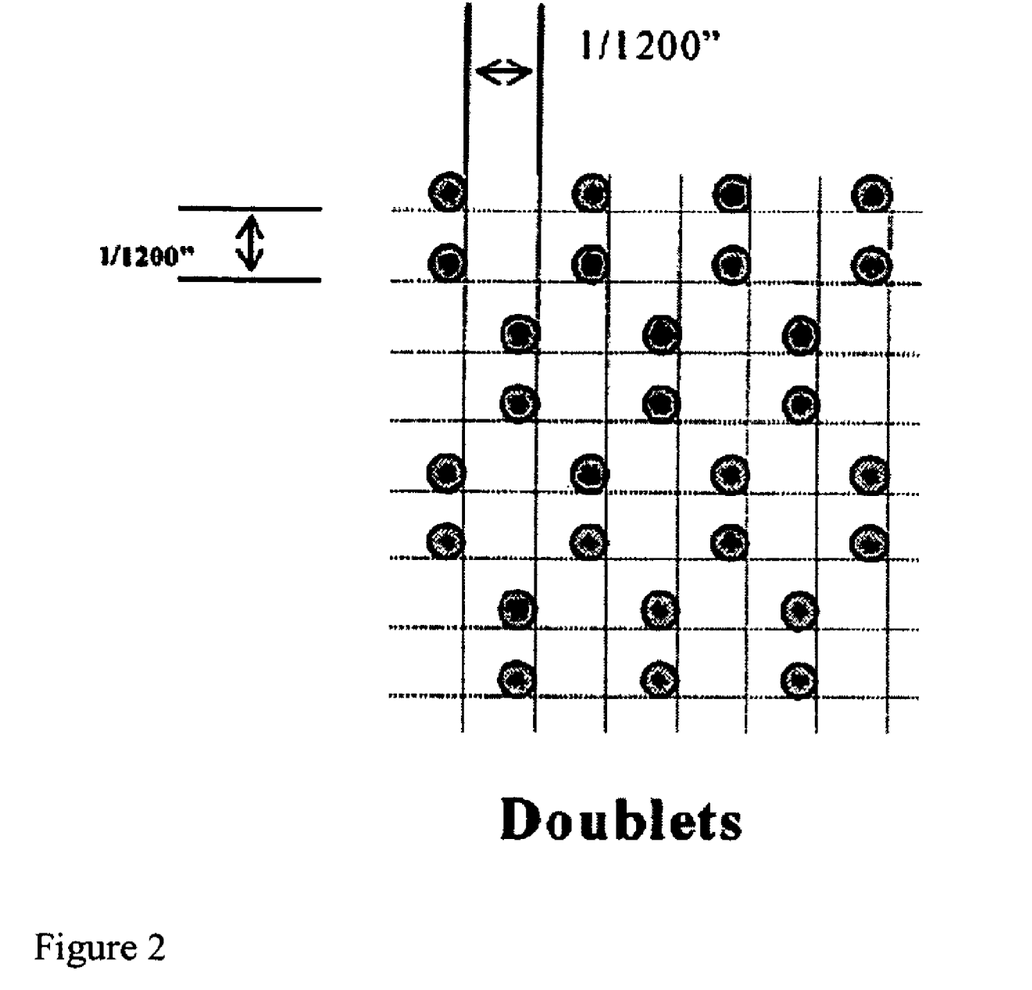
FIG. 2 is an illustration of a 50% Doublet pattern according to one embodiment of the present invention.

One embodiment of the present invention, illustrated in FIG. 2, involves a pseudo-checkerboard pattern of pairs of pixels that can be addressed by dots, such as can be addressed by a printhead having a "Doublets" mode). In an exemplary embodiment, a printhead having a Doublets mode can have a balanced electrical load while attaining the largest physical separation possible between subsequent actuators (e.g., firing heaters). As noted from the figure, however, a printhead having a Doublets mode can still address 50% of pixels per swath pass.

As discussed above, one of the more noticeable print defects can occur at the boundary between two print swaths. This defect can be even more pronounced in low pass printer modes. If a subsequent swath overlaps a prior swath by too much, a dark band can become visible at the boundary. Alternatively, if the subsequent print swath does not overlap a prior swath enough, a white band can become visible at the boundary.

Figure 3:
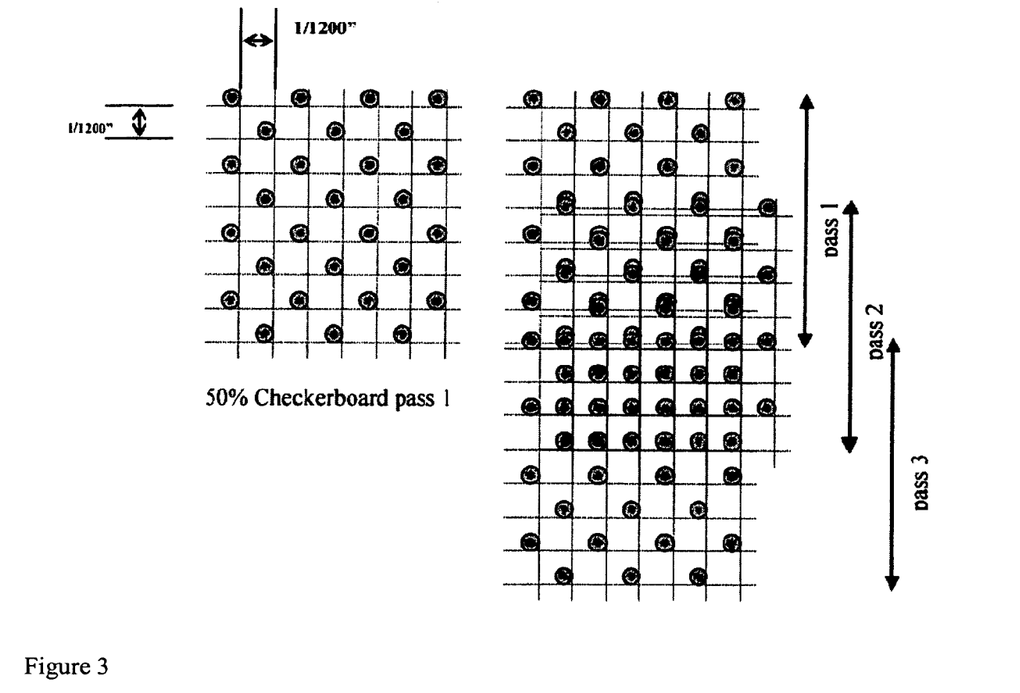
FIG. 3 is an illustration of exemplary boundary errors associated with utilizing a 50% checkerboard print mode known in the prior art.

Assuming perfect registration in the horizontal direction, one can focus on errors in the "down the page", or vertical, direction. For example, in a two-pass printer mode, where a second pass (pass 2) is mis-registered $1/1200"$ down the page and a third pass (pass 3) is in perfect registration relative to the second pass, a printhead operating in a 50% checkerboard print mode could yield the dot placement shown in FIG. 3. In FIG. 3, the areas where pass 1 and pass 2 overlap, and where pass 2 and pass 3 overlap can each be referred to as an overlap zone. As illustrated, an image formed in each of these zones would have a very different appearance due to errors in the vertical direction.

Figure 4:
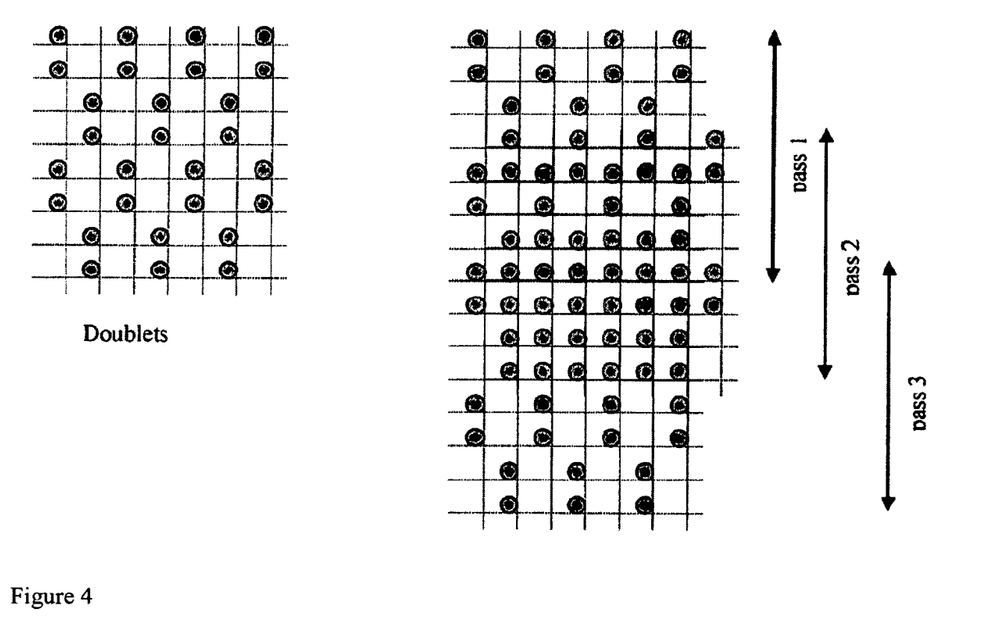
FIG. 4 is an illustration of exemplary swath boundary errors associated with utilizing a 50% Doublet print mode according to another embodiment of the present invention.

FIG. 4 illustrates the same example of a two-pass printer mode, where a second pass (pass 2) is mis-registered $1/1200"$ down the page, and a third pass (pass 3) is in perfect registration relative to the second pass, utilizing a printhead operating in a Doublets mode. In this example, the swath boundary errors are reduced in half due to there being only half as many dots overlapping in the pass 1 and pass 2 overlap zone.

Figure 5:
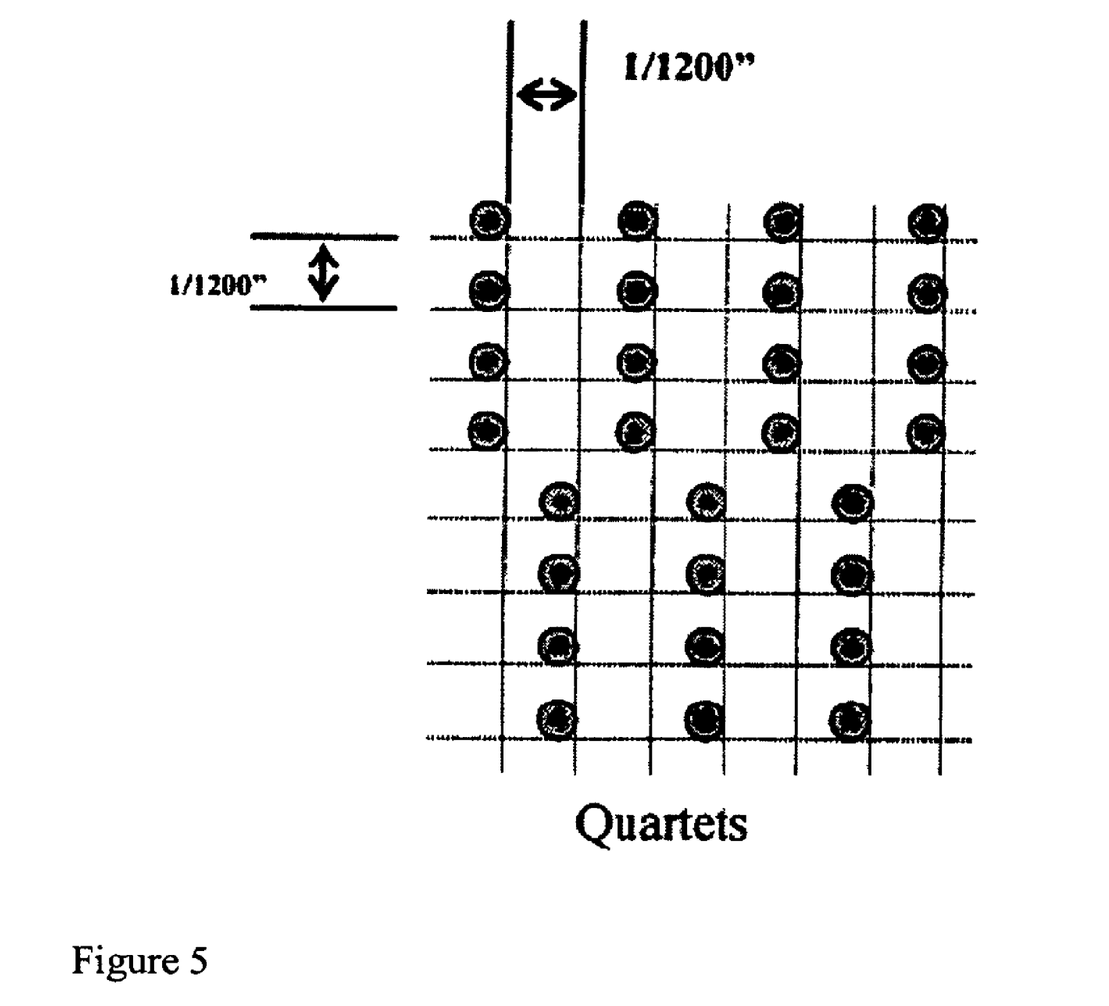
FIG. 5 is an illustration of a 50% Quartet pattern according to another embodiment of the present invention.
Figure 6:
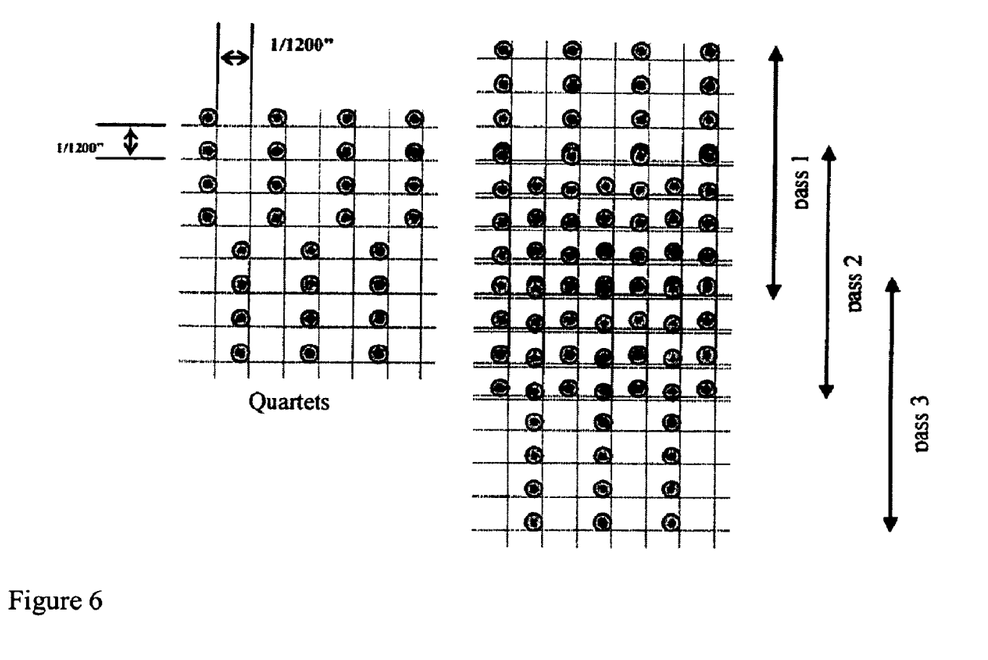
FIG. 6 is an illustration of exemplary swath boundary errors associated with utilizing a 50% Quartet print mode according to yet another embodiment of the present invention.

FIG. 5 illustrates yet another dot pattern associated with an exemplary print mode of the present invention. In a printhead capable of operating in this mode, referred to hereinafter as a "Quartets" mode, the printhead can eject ink to address a pseudo-checkerboard pattern of four pixels, such as that shown in FIG. 5. FIG. 6 illustrates the above example of a printer operating in a two-pass printer mode, wherein a second pass (pass 2) is mis-registered $1/1200"$ down the page and a third pass (pass 3) is in perfect registration relative to the second pass, but utilizing a printhead operating in a Quartets mode. As can be seen in FIG. 6, the swath boundary errors are reduced by approximately 75% as compared to the true checkerboard example illustrated in FIG. 3. This is a result of the Quartets mode having only one quarter as many dots overlapping in the pass 1 and pass 2 overlap zone.

In one embodiment of the present invention, a printhead is capable of operating in a plurality of distinct print modes. In one exemplary embodiment, the plurality of print modes comprises Doublets and Quartets. In this embodiment, the printhead print mode can be selected depending on whether a print job requires a high or low number of printhead passes, which may depend on a quality mode defaulted to by the imaging device or set by a user of the imaging device (e.g., via a driver). This selection can help to alleviate the effects of swath boundary misalignment. For example, as described above, a printhead operating in a Quartets print mode is intended to make the swath boundary less noticeable to visual perception.

In another embodiment of the present invention, the selection of the print mode can be controlled by a bit of address data received by the printhead. For example, in one exemplary embodiment, the selection of whether the printhead is operating in a Doublet or Quartet mode is controlled by a bit (e.g., bit 0) of CMY address data (AData) received by the printhead from the printer driver (e.g., via a printhead driver ASIC, flex cable, TAB circuit, bond pads, etc.).

An exemplary table of address data is depicted in FIG. 7. In this embodiment, the bit is under firmware control (e.g., firmware operating on the printer). Other information regarding the print job, such as number of passes, etc., are contained in a swath header sent to the printer by the printer driver, wherein the swath header might comprise a set of parameters that precede print data being sent to the printer. The firmware of the printer, for example, can then select the applicable chip mode, such as by setting a bit in the AData.

Figure 8:
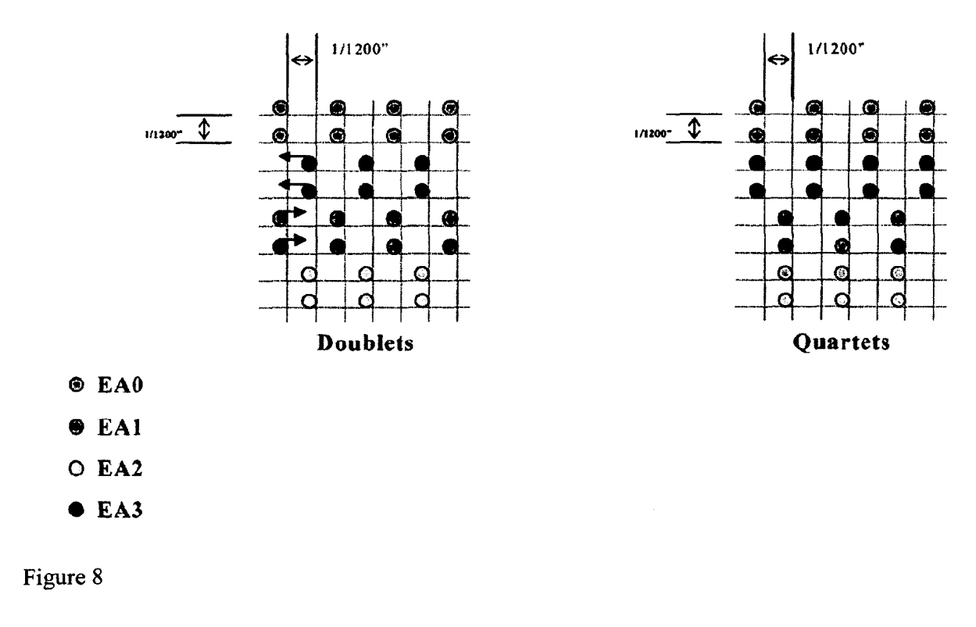
FIG. 8 is an exemplary illustration of the pixels that can be addressed by a printhead operating in Doublet and Quartet print modes according to another embodiment of the present invention.

In yet another embodiment of the present invention, the printhead operates in a Doublet mode when bit 0 is held low. When bit 0 is set high, the printhead operates in a Quartet print mode. In one exemplary embodiment, as illustrated in FIG. 8, the internal heater address architecture of the printhead comprises 4 extended addresses (EA0-3) and 5 addresses. When bit 0 is set high, logic associated with the heater circuits is configured such that EA1 and EA3 are reversed or switched. As such, in Quartet mode (when bit 0 is set high), a heater addressed normally by EA1 is addressed by EA3 and a heater normally addressed by EA3 is addressed by EA1. This switch results in EA1 heaters being delayed by $1/1200"$ and EA3 heaters being advanced by $1/1200"$.

Figure 9:
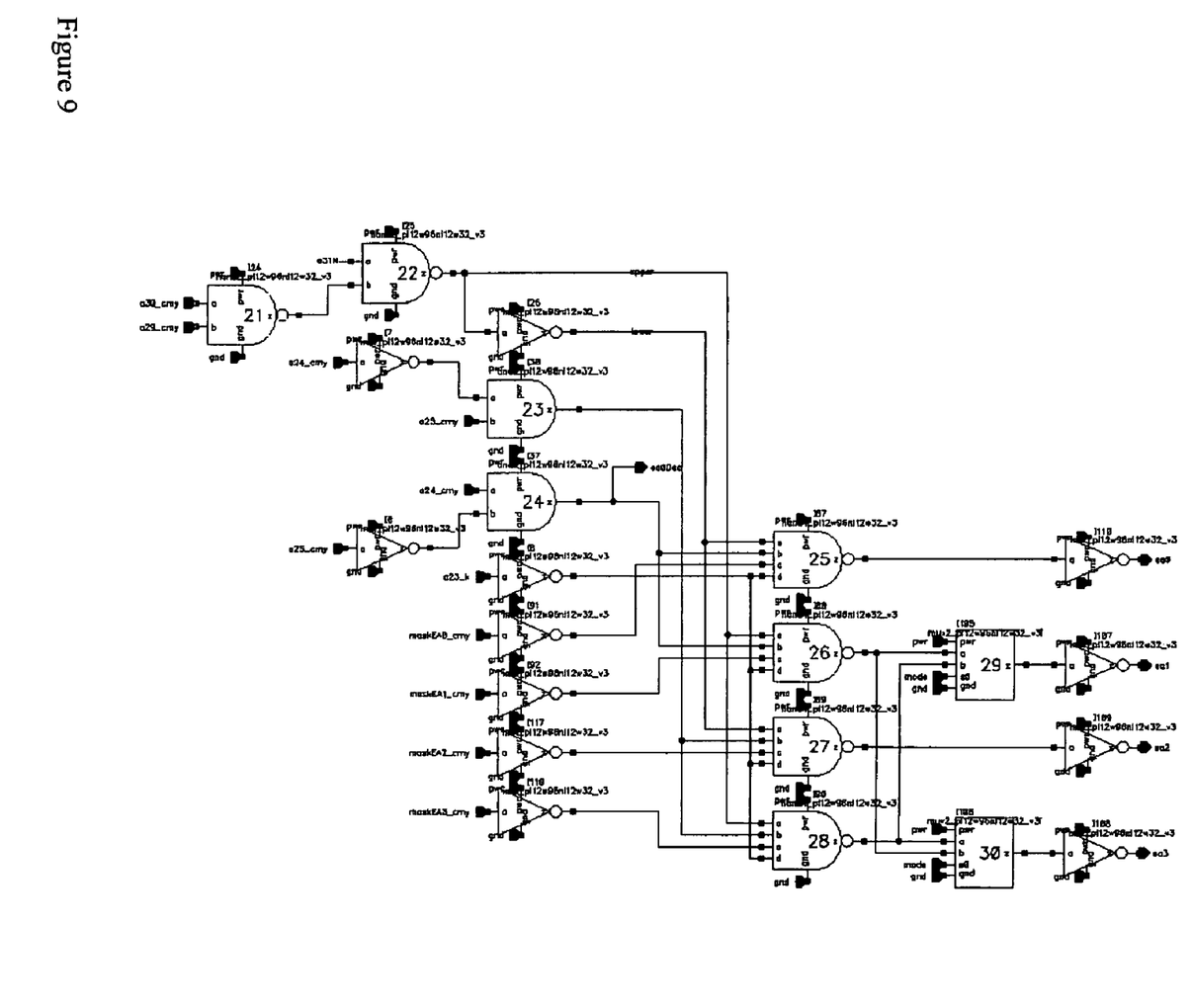
FIG. 9 is an exemplary schematic illustration of a printhead heater circuit architecture according to another embodiment of the present invention.

As one skilled in the art will appreciate, there are numerous ways in which the switching or reversing of EA1 and EA3 heaters can occur. FIG. 9 illustrates one exemplary embodiment. In this embodiment, the address switching does not require extensive additional logic. The EA1 and EA3 address switch is performed in an EA Decode logic cell of the EA address sent to the printhead as part of the CMY AData. NAND gates 26 and 28 decode the EA1 and EA3 addresses. Multiplexers 29 and 30 select which signal is output on the internal heater address bus under control of Bit 0 of the CMY AData. As such, by switching EA1 and EA3 addresses, the printhead changes from operating in a Doublet mode to operating in a Quartet mode.

In addition, one skilled in the art will appreciate that various print modes can be utilized with the present invention. By switching the addressing for one or more heater circuits, the heater circuits can be configured to invoke other print modes including but not limited to triplets.

In another exemplary embodiment, a print mode is selected and/or changed on each pass of the printhead. For example, the printhead may operate in a first print mode when traveling in a first direction and a second print mode when traveling in another direction. In an alternative embodiment, a print mode is selected at the start of each print job. In another exemplary embodiment, one of the plurality of modes may be selected in accordance with multiple bits of the address data received by the printhead.

The foregoing description of the various embodiments and principles of the invention has been presented for the purpose of illustration and description. It is not intended to be exhaustive or to limit the inventions to the precise forms disclosed. Many alternatives, modifications and variations will be apparent to those skilled in the art. Moreover, although multiple inventive aspects have been presented, such aspects need not be utilized in combination, and various combinations of inventive aspects are possible in light of the various embodiments provided above. Accordingly, the above description is intended to embrace all possible alternatives, modifications, combinations, and variations that have been discussed or suggested herein, as well as all others that fall within the principals, spirit and broad scope of the invention as defined by the claims.

We claim:

1. A printhead configured to operate in accordance with a plurality of print modes, wherein one of the plurality of print modes can be selected in accordance with a bit of address data received by the printhead, wherein each of the plurality of print modes comprise a pattern of pixels that the printhead is capable of addressing during a single unidirectional scan, wherein one of the plurality of print modes is selected depending on the number of printhead passes required by a print job, wherein a print mode is selected for each pass of the printhead and said each pass of the printhead is configured as a full pixel advance in the sub-scan direction of an imaging device in which the printhead is installed, wherein the pattern of pixels in each successive pass has at least two successive raster lines that are exactly the same and a number of successive passes required to provide a full print coverage for every raster line corresponds to the number of said successive raster lines that are said exactly the same.

2. The printhead of claim 1, wherein the printhead operates in one of the plurality of modes when the printhead is traveling in a first direction and operates in another one of the plurality of modes when the printhead is traveling is a second direction.

3. The printhead of claim 1, wherein one of the plurality of modes comprises a Quartets print mode.

4. The printhead of claim 1, wherein one of the plurality of modes comprises a Doublets print mode.

5. The printhead of claim 1, wherein the plurality of modes is selected from the group consisting of: Quartets print mode and Doublets print mode.

6. The printhead of claim 1, wherein at least one of the plurality of modes is configured to reduce horizontal banding artifacts.

7. The printhead of claim 1, wherein the bit of the address data is set by firmware operating on an imaging device using the printhead.

8. The printhead of claim 1, wherein the printhead is adapted to switch at least one heater circuit address in accordance with the bit of the address data received by the printhead.

9. The printhead of claim 1, wherein the address data is generated by an application specific integrated circuit of an imaging device, and the bit of the address data is set in response to a swath header received by the application specific integrated circuit.

10. A printhead configured to operate in accordance with a plurality of print modes, wherein one of the plurality of print modes can be selected by switching at least one actuator circuit address on the printhead, wherein each of the plurality of print modes comprise a pattern of pixels that the printhead is capable of addressing during a single unidirectional scan, wherein one of the plurality of print modes is selected depending on the number of printhead passes, required by a print job, wherein a print mode is selected for each pass of the printhead and said each pass of the printhead is configured as a full pixel advance in the sub-scan direction of an imaging device in which the printhead is installed, wherein the pattern of pixels in each successive pass has at least two successive raster lines that are exactly the same and a number of successive passes required to provide a full print coverage for every raster line corresponds to the number of said successive raster lines that are said exactly the same.

11. The printhead of claim 10, wherein the switched actuator circuit addresses are configured to change operation of the printhead from a first print mode to a second print mode.

12. The printhead of claim 10, wherein the print head is configured such that switching at least one actuator circuit address results in a change in timing of ink ejected from at least one nozzle of the printhead.

13. The printhead of claim 10, wherein a plurality of actuator circuit addresses are switched on the printhead.

14. The printhead of claim 10, wherein the at least one actuator circuit address is switched in response to a bit of address data received by the printhead.

15. The printhead of claim 14, wherein the bit of address data is set by firmware operating on the imaging device and transmitted by an application specific integrated circuit of the imaging device.

16. The printhead of claim 15, wherein the bit of address data is set in accordance with a number of passes indicated by a swath header.

17. The printhead of claim 16, wherein the swath header is sent to the imaging device by a computing device associated with the imaging device.

18. A printhead configured to operate in accordance with a plurality of modes, wherein one of a first mode and a second mode is selected by switching at least one heater circuit address on the printhead, and wherein the at least one heater circuit address is switched in response to a bit of address data received by the printhead, wherein each of the plurality of print modes comprise a pattern of pixels that the printhead is capable of addressing during a single unidirectional scan, wherein one of the first print mode and the second print mode is selected depending on the number of printhead passes required by a print job, wherein a print mode is selected for each pass of the printhead and said each pass of the printhead is a full pixel advance in the sub-scan direction of an imaging device in which the printhead is installed, wherein the pattern of pixels in each successive pass has at least two successive raster lines that are exactly the same and a number of successive passes required to provide a full print coverage for every raster line corresponds to the number of said successive raster lines that are said exactly the same.

19. The printhead of claim 18, wherein the bit of address data is set in accordance with a number of passes indicated by a swath header.

20. The printhead of claim 19, wherein the swath header is sent to an imaging device by a computing device associated with the imaging device.

* * * * *